United States Patent
Glugla et al.

(10) Patent No.: US 11,053,868 B2
(45) Date of Patent: Jul. 6, 2021

(54) METHOD AND SYSTEM FOR DETERMINING PISTON SLAP

(71) Applicant: Ford Global Technologies, LLC, Dearborn, MI (US)

(72) Inventors: Christopher P. Glugla, Macomb, MI (US); Rani Kiwan, Ann Arbor, MI (US); Mohannad Hakeem, Dearborn, MI (US); Donald J. Lewis, Bath Springs, TN (US)

(73) Assignee: Ford Global Technologies, LLC, Dearborn, MI (US)

( * ) Notice: Subject to any disclaimer, the term of this patent is extended or adjusted under 35 U.S.C. 154(b) by 115 days.

(21) Appl. No.: 16/129,562

(22) Filed: Sep. 12, 2018

(65) Prior Publication Data

US 2020/0080502 A1    Mar. 12, 2020

(51) Int. Cl.
  *F02D 35/02*    (2006.01)
  *G01L 23/22*    (2006.01)
  *F16F 15/24*    (2006.01)
  *F02D 41/06*    (2006.01)

(52) U.S. Cl.
  CPC .......... *F02D 35/027* (2013.01); *G01L 23/221* (2013.01); *F02D 41/062* (2013.01); *F16F 15/24* (2013.01)

(58) Field of Classification Search
  CPC ...... F02D 35/027; F02D 41/062; F02D 37/02; F02D 31/001; F02D 2250/14; G01L 23/221; F16F 15/24
  See application file for complete search history.

(56) References Cited

U.S. PATENT DOCUMENTS

| | | | | |
|---|---|---|---|---|
| 4,444,049 A | * | 4/1984 | Hitchcock | F02B 77/08 73/114.28 |
| 5,163,404 A | * | 11/1992 | Witkowski | F02P 5/152 123/406.37 |
| 6,945,229 B1 | | 9/2005 | Zhu et al. | |
| 9,695,761 B2 | * | 7/2017 | Bizub | F02D 35/02 |
| 2016/0265454 A1 | * | 9/2016 | Bizub | G01L 23/221 |
| 2017/0051688 A1 | * | 2/2017 | Glugla | F02D 41/0002 |
| 2018/0087460 A1 | * | 3/2018 | Pathan | F02D 41/1498 |

OTHER PUBLICATIONS

Hakeem, M. et al., "Method and System for Variable Displacement Engine Knock Control," U.S. Appl. No. 15/985,257, filed May 21, 2018, 77 pages.

Hakeem, M. et al., "Method and System for Adjusting Engine Knock Background Noise of a Variable Displacement Engine," U.S. Appl. No. 15/985,337, filed May 21, 2018, 75 pages.

(Continued)

*Primary Examiner* — Hung Q Nguyen
*Assistant Examiner* — Susan E Scharpf
(74) *Attorney, Agent, or Firm* — Geoffrey Brumbaugh; McCoy Russell LLP

(57) ABSTRACT

Methods and systems are disclosed for operating an engine that includes a knock control system. The methods and system provide for repurposing the engine knock control system to detect and mitigate piston slap. The methods and systems also seek to increase the signal to noise ratio for detecting piston slap.

8 Claims, 8 Drawing Sheets

(56) References Cited

OTHER PUBLICATIONS

Hakeem, M. et al., "Method and System for Adjusting Engine Knock Background Noise Levels," U.S. Appl. No. 15/985,428, filed May 21, 2018, 93 pages.
Kiwan, R. et al., "Method and System for Learning Contributions to an Engine Knock Background Noise Level," U.S. Appl. No. 16/122,065, filed Sep. 5, 2018, 49 pages.
Glugla, C. et al., "Method and System for Determining Engine Knock Background Noise Levels," U.S. Appl. No. 16/144,762, filed Sep. 27, 2018, 56 pages.
Glugla, C. et al., "Method and System for Detecting Engine Knock During Transient Conditions," U.S. Appl. No. 16/155,394, filed Oct. 9, 2018, 48 pages.
Kiwan, R. et al., "Method and System for Engine Knock Detection," U.S. Appl. No. 16/171,247, filed Oct. 25, 2018, 52 pages.
Kiwan, R. et al., "Method and System for Applying Engine Knock Windows," U.S. Appl. No. 16/170,869, filed Oct. 25, 2018, 68 pages.
Kiwan, R. et al. "Method and System for Learning Contributions of Engine Knock Background Noise for a Variable Displacement Engine," U.S. Appl. No. 16/195,695, filed Nov. 19, 2018, 75 pages.

\* cited by examiner

METHOD AND SYSTEM FOR DETERMINING PISTON SLAP

FIELD

The present application relates to methods and systems for determining the presence or absence of piston slap noise within an engine.

BACKGROUND/SUMMARY

A small gap may be present between walls of a cylinder of an internal combustion engine and a piston that is located within the cylinder. The small gap may be related to clearances between parts, manufacturing part variation, dissimilar materials expanding and contracting at different rates, and other reasons. In addition, the small gap may increase in size as the engine ages if an engine is started and idled at cold temperatures, the engine's piston may shift from side to side, thereby striking the cylinder's walls creating a slapping noise, which may be referred to as piston slap. If the engine is operated and it reaches a nominal operating temperature, heat within the engine may expand the piston and piston rings such that the gap is reduced and the slapping noise ceases. It may be desirable to avoid noise produced by piston slap, but it may also be difficult to predict if piston slap will occur in a particular engine. Further, it may be difficult to discern piston slap from other engine noises. Consequently, it may be difficult to take mitigating actions to avoid piston slap.

The inventors herein have developed an engine operating method, comprising: adjusting a crankshaft angle where a knock window of a cylinder opens and adjusting a crankshaft angle where the knock window of the cylinder closes via a controller in response to a request to detect piston slap in the cylinder; and adjusting one or more actuators via the controller according to piston slap detected in the knock window.

By adjusting a crankshaft angle where a knock window of a cylinder opens and adjusting a crankshaft angle where the knock window of the cylinder closes, it may be possible to provide the technical result of improving a signal to noise ratio of a knock sensor signal to detect piston slap condition during a cycle of an engine. Further, output of a knock sensor may be filtered via a band pass filter with a pass band that has a lower frequency range when the engine is being evaluated for piston slap. For example, base opening and closing timings of a knock window associated with a cylinder may be retarded so as to center the knock window about a crankshaft angle where piston slap may occur instead of at a crankshaft angular interval where knock within the cylinder is expected to occur. Consequently, output of the knock sensor may be integrated within a crankshaft interval where vibrations resulting from piston slap are expected to have a higher energy level and lower frequency content so that piston slap may be more easily distinguished from engine background noise. If piston slap is detected, engine idle speed may be increased and/or spark timing may be retarded to reduce audible piston slap noise.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
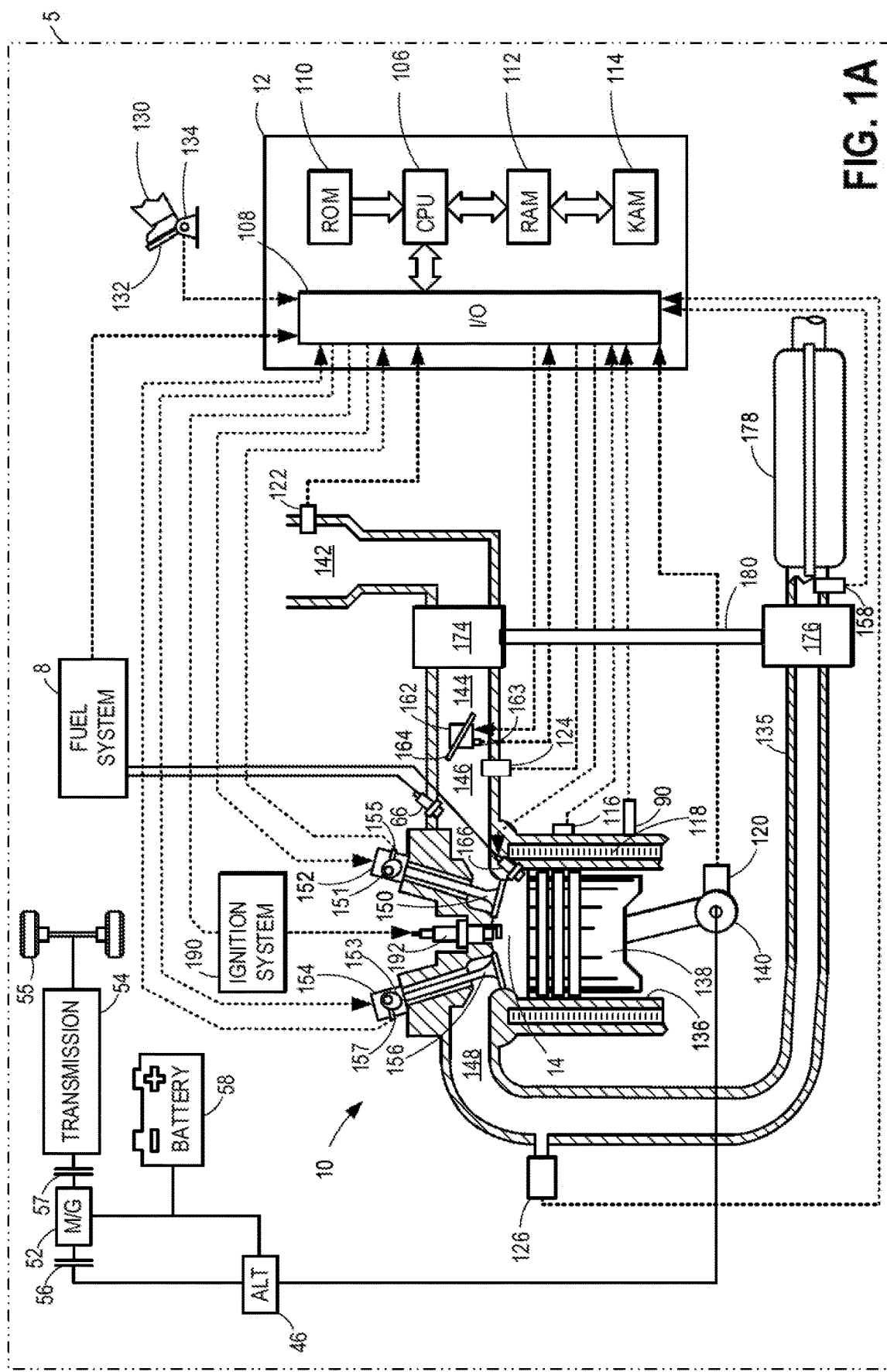
FIG. 1A shows a schematic depiction of an engine system of a vehicle.
Figure 1C:
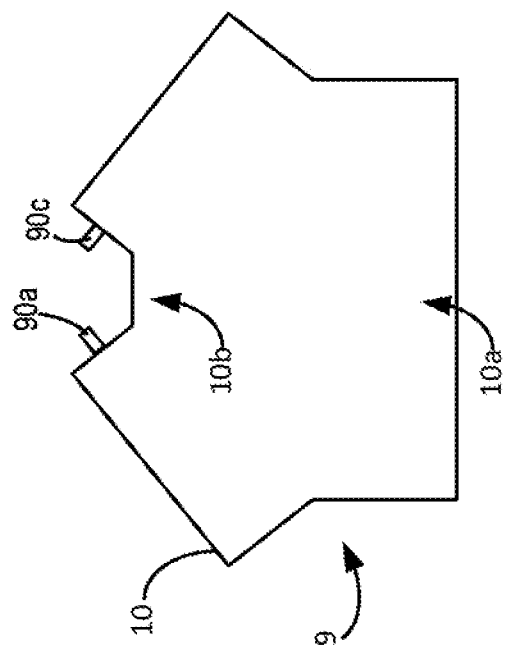
FIG. 1C shows an alternative view of knock sensor locations for the V8 engine.
Figure 1B:
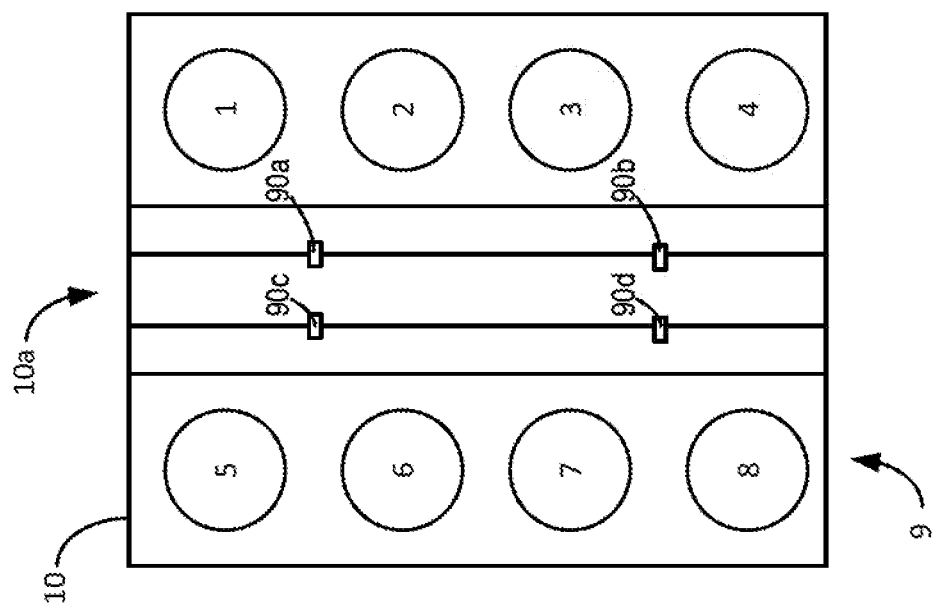
FIG. 1B shows example locations for knock sensors for a V8 engine.
Figure 5:
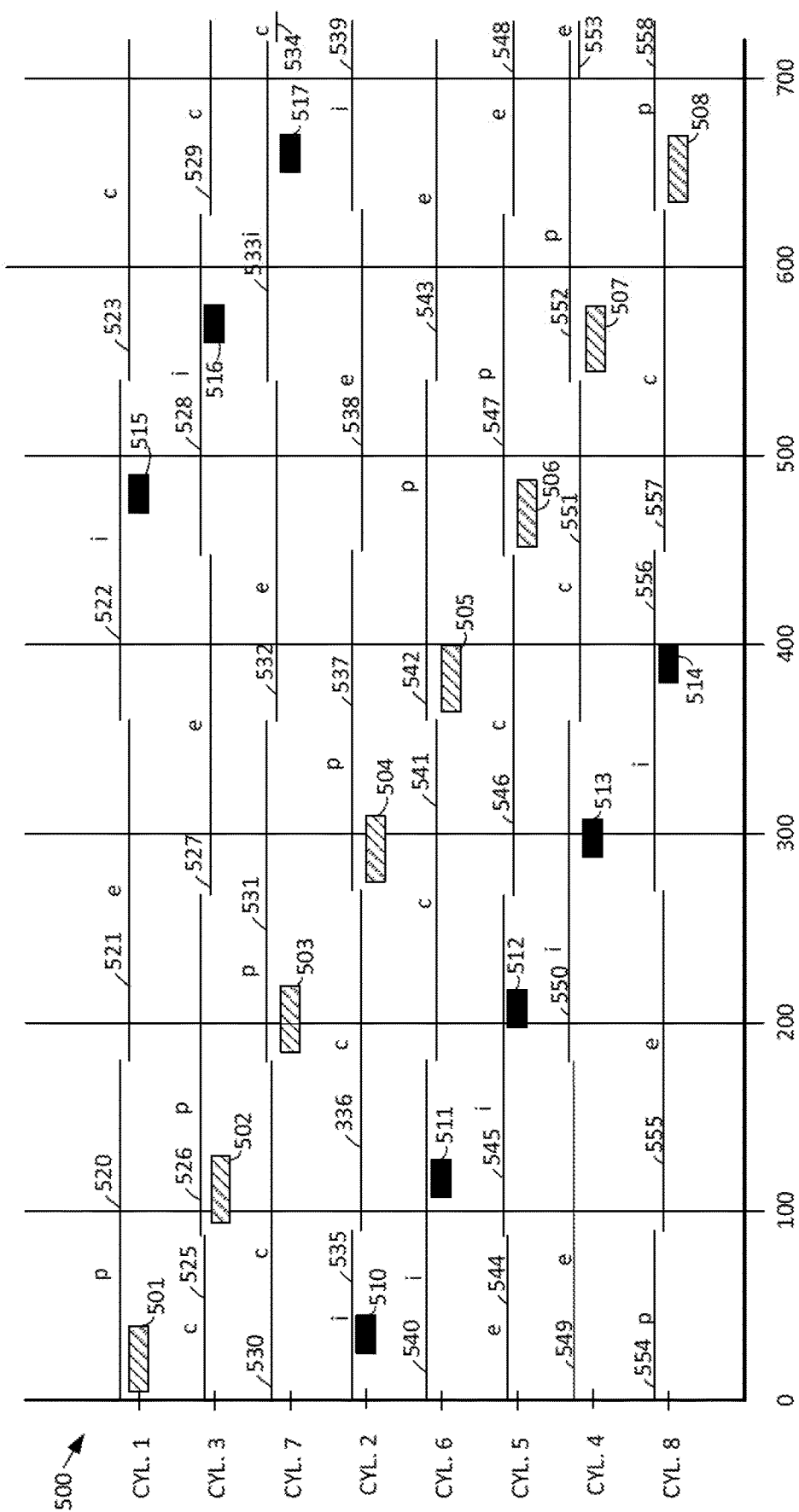
FIGS. 5-7 show example engine operating sequences for illustrating the method of FIGS. 2-4.
Figure 6:
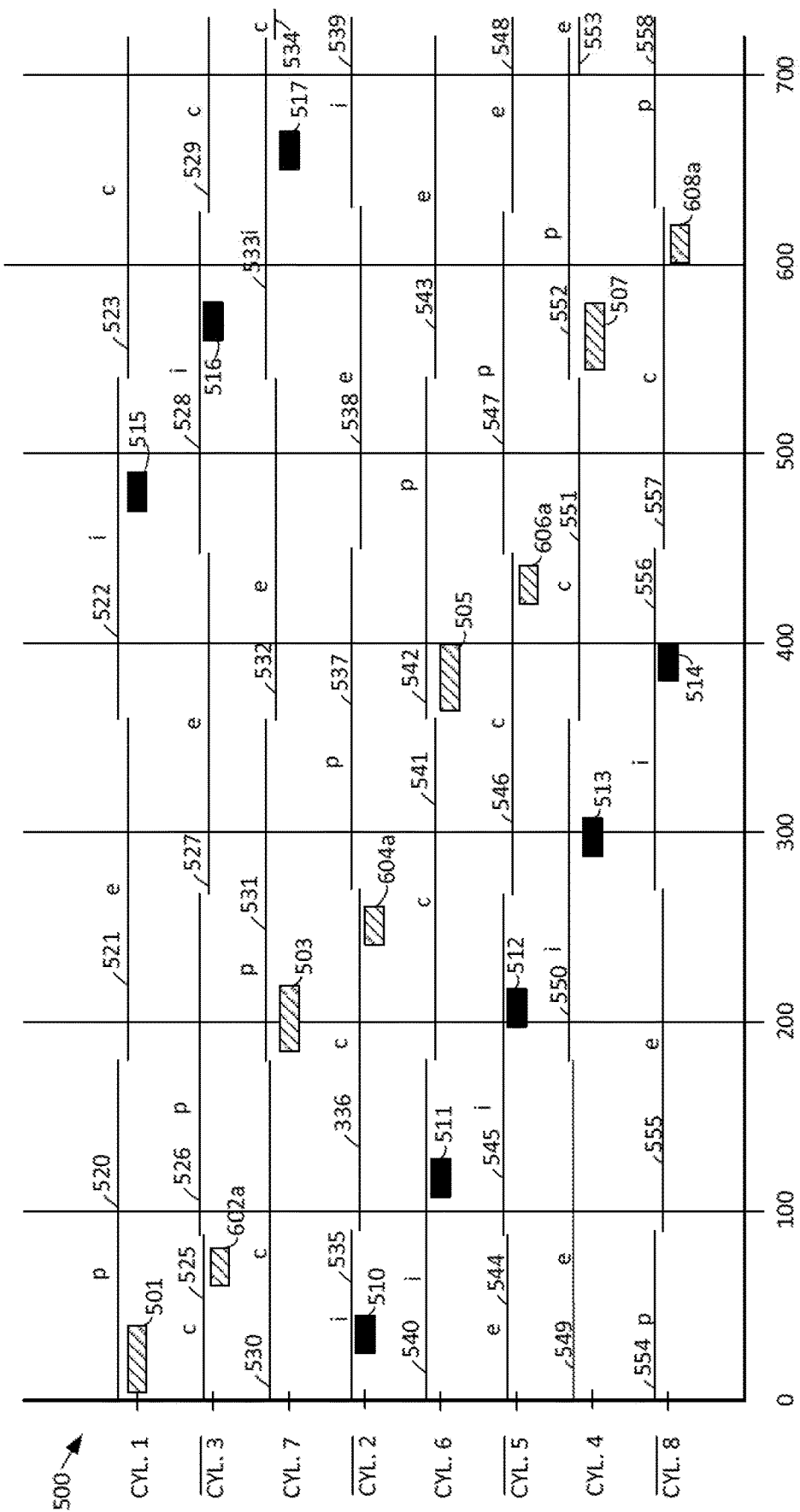
Figure 7:
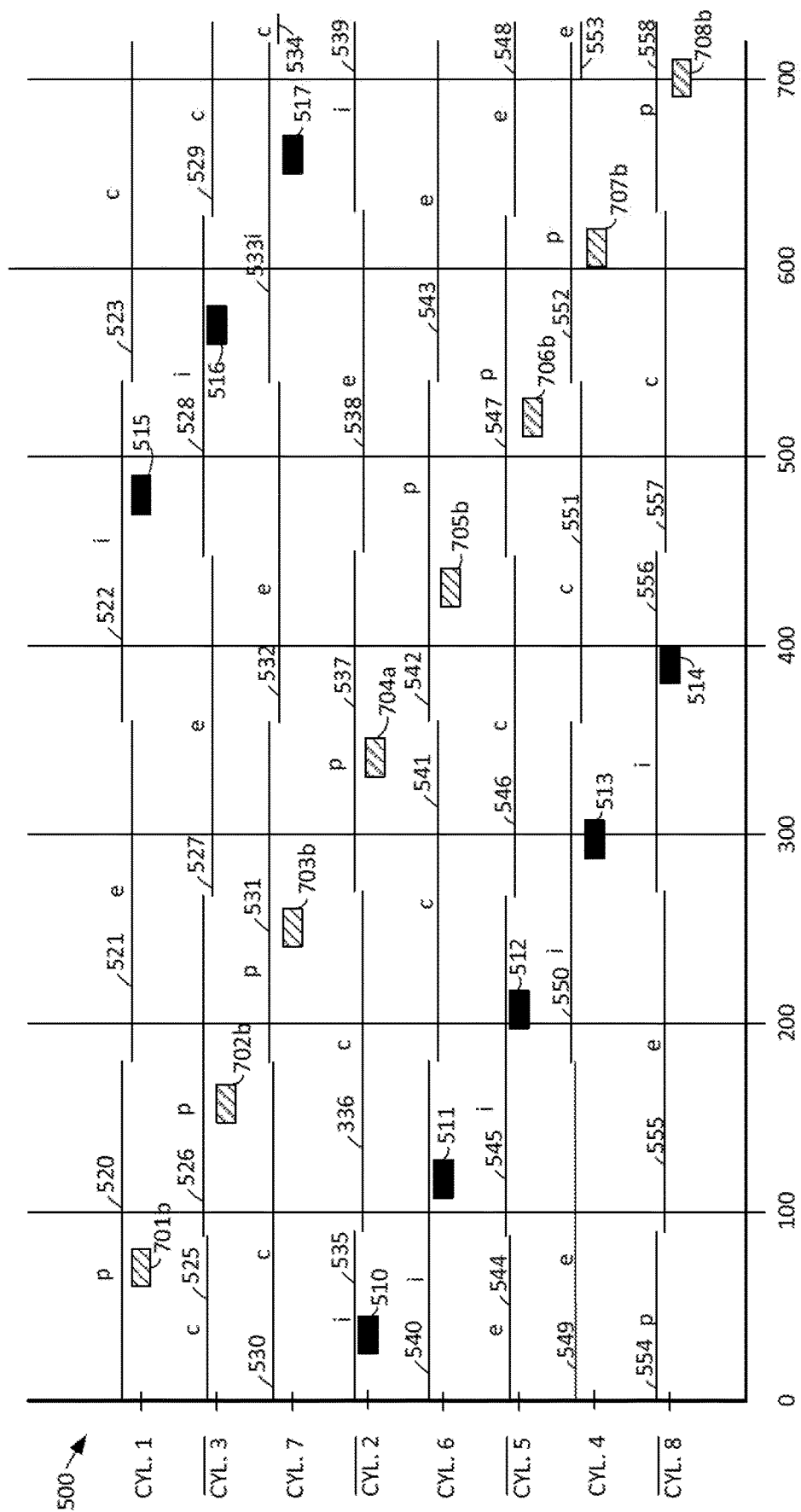

The following description relates to systems and methods for operating an engine that includes a knock control system. The engine may be of the type that is shown in FIGS. 1A-1C. The engine may be operated according to the method of FIGS. 2-4. The method may adjust operation of the knock control system to improve piston slap detection and mitigation. In one example, the system may adjust timing or crankshaft angles where knock windows are opened and closed so as to improve detection of piston slap. The method may operate as shown in the sequences of FIGS. 5-7.

Turning now to the figures, FIG. 1A depicts an example of a cylinder 14 of an internal combustion engine 10, which may be included in a vehicle 5. Engine 10 may be controlled at least partially by a control system, including a controller 12, and by input from a human vehicle operator 130 via an input device 132. In this example, input device 132 includes an accelerator pedal and a pedal position sensor 134 for generating a proportional pedal position signal. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 of vehicle 5 via a transmission 54, as further described below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 57 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners, including as a parallel, a series, or a series-parallel hybrid vehicle. In electric vehicle examples, a system battery 58 may be a traction battery that delivers electrical power to electric machine 52 to provide torque to vehicle wheels 55. In some examples, electric machine 52 may also be operated as a generator to provide electrical power to charge system battery 58, for example, during a braking operation. It will be appreciated that in other examples, including non-electric vehicle examples, system battery 58 may be a typical starting, lighting, ignition (SLI) battery coupled to an alternator 46.

Alternator 46 may be configured to charge system battery 58 using engine torque via crankshaft 140 during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based upon system usage requirements, including auxiliary system demands.

Cylinder 14 of engine 10 can receive intake air via a series of intake passages 142 and 144 and an intake manifold 146. Intake manifold 146 can communicate with other cylinders of engine 10 in addition to cylinder 14. One or more of the intake passages may include one or more boosting devices, such as a turbocharger or a supercharger. For example, FIG. 1A shows engine 10 configured with a turbocharger, including a compressor 174 arranged between intake passages 142 and 144 and an exhaust turbine 176 arranged along an exhaust passage 135. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted. In still other examples, engine 10 may be provided with an electric supercharger (e.g., an "eBooster"), and compressor 174 may be driven by an electric motor. In still other examples, engine 10 may not be provided with a boosting device, such as when engine 10 is a naturally aspirated engine.

A throttle 162 including a throttle plate 164 may be provided in the engine intake passages for varying a flow rate and/or pressure of intake air provided to the engine cylinders. For example, throttle 162 may be positioned downstream of compressor 174, as shown in FIG. 1A, or may be alternatively provided upstream of compressor 174. A position of throttle 162 may be communicated to controller 12 via a signal from a throttle position sensor.

An exhaust manifold 148 can receive exhaust gases from other cylinders of engine 10 in addition to cylinder 14. An exhaust gas sensor 126 is shown coupled to exhaust manifold 148 upstream of an emission control device 178. Exhaust gas sensor 126 may be selected from among various suitable sensors for providing an indication of an exhaust gas air/fuel ratio (AFR), such as a linear oxygen sensor or UEGO (universal or wide-range exhaust gas oxygen), a two-state oxygen sensor or EGO, a HEGO (heated EGO), a NOx, a HC, or a CO sensor, for example. In the example of FIG. 1A, exhaust gas sensor 126 is a UEGO sensor. Emission control device 178 may be a three-way catalyst, a NOx trap, various other emission control devices, or combinations thereof. In the example of FIG. 1A, emission control device 178 is a three-way catalyst.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. In this example, intake valve 150 may be controlled by controller 12 by cam actuation via cam actuation system 152, including one or more cams 151. Similarly, exhaust valve 156 may be controlled by controller 12 via cam actuation system 154, including one or more cams 153. The position of intake valve 150 and exhaust valve 156 may be determined by valve position sensors (not shown) and/or camshaft position sensors 155 and 157, respectively.

During some conditions, controller 12 may vary the signals provided to cam actuation systems 152 and 154 to control the opening and closing of the respective intake and exhaust valves. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of variable displacement engine (VDE), cam profile switching (CPS), variable cam timing (VCT), variable valve timing (VVT), and/or variable valve lift (VVL) systems that may be operated by controller 12 to vary valve operation. In alternative examples, intake valve 150 and/or exhaust valve 156 may be controlled by electric valve actuation. For example, cylinder 14 may alternatively include an intake valve controlled via electric valve actuation and an exhaust valve controlled via cam actuation, including CPS and/or VCT systems. In other examples, the intake and exhaust valves may be controlled by a common valve actuator (or actuation system) or a variable valve timing actuator (or actuation system).

As further described herein, intake valve 150 and exhaust valve 156 may be deactivated during VDE mode via electrically actuated rocker arm mechanisms. In another example, intake valve 150 and exhaust valve 156 may be deactivated via a CPS mechanism in which a cam lobe with no lift is used for deactivated valves. Still other valve deactivation mechanisms may also be used, such as for electrically actuated valves. In one example, deactivation of intake valve 150 may be controlled by a first VDE actuator (e.g., a first electrically actuated rocker arm mechanism, coupled to intake valve 150) while deactivation of exhaust valve 156 may be controlled by a second VDE actuator (e.g., a second electrically actuated rocker arm mechanism, coupled to exhaust valve 156). In alternate examples, a single VDE actuator may control deactivation of both intake and exhaust valves of the cylinder. In still other examples, a single cylinder valve actuator deactivates a plurality of cylinders (both intake and exhaust valves), such as all of the cylinders in an engine bank, or a distinct actuator may control deactivation for all of the intake valves while another distinct actuator controls deactivation for all of the exhaust valves of the deactivated cylinders. It will be appreciated that if the cylinder is a non-deactivatable cylinder of the VDE engine, then the cylinder may not have any valve deactivating actuators. Each engine cylinder may include the valve control mechanisms described herein. Intake and exhaust valves are held in closed positions over one or more engine cycles when deactivated so as to prevent flow into or out of cylinder 14.

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with a higher latent enthalpy of vaporization are used. The compression ratio may also be increased if direct injection is used due to its effect on engine knock.

Each cylinder of engine 10 may include a spark plug 192 for initiating combustion. An ignition system 190 can provide an ignition spark to combustion chamber 14 via spark plug 192 in response to a spark advance signal from controller 12, under select operating modes. Spark timing may be adjusted based on engine operating conditions and driver torque demand. For example, spark may be provided at minimum spark advance for best torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples, spark may be retarded from MBT, such as to expedite catalyst warm-up during engine start or to reduce an occurrence of engine knock.

In some examples, each cylinder of engine 10 may be configured with one or more fuel injectors for providing fuel thereto. As a non-limiting example, cylinder 14 is shown including a direct fuel injector 166 and a port fuel injector 66. Fuel injectors 166 and 66 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to a pulse width of a signal received from controller 12. Port fuel injector 66 may be controlled by controller 12 in a similar way. In this manner, fuel injector 166 provides what is known as direct injection (hereafter also referred to as "DI") of fuel into cylinder 14. While FIG. 1A shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injectors 166 and 66 from a fuel tank of fuel system 8 via fuel pumps and fuel rails. Further, the fuel tank may have a pressure transducer providing a signal to controller 12.

Fuel injectors 166 and 66 may be configured to receive different fuels from fuel system 8 in varying relative amounts as a fuel mixture and further configured to inject this fuel mixture directly into cylinder. For example, fuel injector 166 may receive alcohol fuel and fuel injector 66 may receive gasoline. Further, fuel may be delivered to cylinder 14 during different strokes of a single cycle of the cylinder. For example, directly injected fuel may be delivered at least partially during a previous exhaust stroke, during an intake stroke, and/or during a compression stroke. Port injected fuel may be injected after intake valve closing of a previous cycle of the cylinder receiving fuel and up until intake valve closing of the present cylinder cycle. As such, for a single combustion event (e.g., combustion of fuel in the cylinder via spark ignition), one or multiple injections of fuel may be performed per cycle via either or both injectors. The multiple DI injections may be performed during the compression stroke, intake stroke, or any appropriate combination thereof in what is referred to as split fuel injection.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of alcohol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling.

Controller 12 is shown in FIG. 1A as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 135; a crankshaft position signal from a Hall effect sensor 120 (or other type) coupled to crankshaft 140; throttle position from a throttle position sensor 163; signal UEGO from exhaust gas sensor 126, which may be used by controller 12 to determine the air-fuel ratio of the exhaust gas; engine vibrations (e.g., caused by knock) via vibration sensing knock sensor 90; and an absolute manifold pressure signal (MAP) from a MAP sensor 124. An engine speed signal, RPM, may be generated by controller 12 from crankshaft position. The manifold pressure signal MAP from MAP sensor 124 may be used to provide an indication of vacuum or pressure in the intake manifold. Controller 12 may infer an engine temperature based on the engine coolant temperature and infer a temperature of emission control device 178 based on the signal received from temperature sensor 158.

Controller 12 receives signals from the various sensors of FIG. 1A and employs the various actuators of FIG. 1A to adjust engine operation based on the received signals and instructions stored on a memory of the controller. For example, the controller may transition the engine to operating in VDE mode by actuating valve actuators 152 and 154 to deactivate selected cylinders, as further described with respect to FIG. 5.

As described above, FIG. 1A shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1A with reference to cylinder 14.

During selected conditions, such as when the full torque capability of engine 10 is not requested, one of a first or a second cylinder group may be selected for deactivation by controller 12 (herein also referred to as a VDE mode of operation). During the VDE mode, cylinders of the selected group of cylinders may be deactivated by shutting off respective fuel injectors 166 and 66. Further, valves 150 and 156 may be deactivated and held closed over one or more engine cycles. While fuel injectors of the disabled cylinders are turned off, the remaining enabled cylinders continue to carry out combustion, with corresponding fuel injectors and intake and exhaust valves active and operating. To meet torque requirements, the controller adjusts the amount of air entering active engine cylinders. Thus, to provide equivalent engine torque that an eight cylinder engine produces at 0.2 engine load and a particular engine speed, the active engine cylinders may operate at higher pressures than engine cylinders when the engine is operated with all engine cylinders being active. This requires higher manifold pressures, resulting in lowered pumping losses and increased engine efficiency. Additionally, the lower effective surface area (from only the active cylinders) exposed to combustion reduces engine heat losses, increasing the thermal efficiency of the engine.

Referring now to FIG. 1B, a plan view of engine 10 is shown. Front 10*a* of engine 10 may include a front end accessory drive (FEAD) (not shown) to provide power to an alternator, power steering system, and air conditioning compressor. In this example, engine 10 is shown in a V8 configuration with eight cylinders that are numbered 1-8. Engine knock may be sensed via four knock sensors 90*a*-90*d*. In other examples, the actual number of knock sensors may be less than or greater than four. The knock sensors are positioned in the valley of engine block 9. In this example, output of knock sensor 90*a* is sampled (e.g., measured and filtered via a band-pass filter) via controller 12 during the knock windows (e.g., crankshaft angular intervals) of engine cylinders 1 and 2. Output of knock sensor 90*b* is sampled via controller 12 during the knock windows of engine cylinders 3 and 4. Output of knock sensor 90*c* is sampled via controller 12 during the knock windows of engine cylinders 5 and 6. Output of knock sensor 90*c* is sampled via controller 12 during the knock windows of engine cylinders 7 and 8. The plurality of knock sensors improves the ability to detect knock for each cylinder since attenuation of engine vibrations from knock increases as the distance from the knocking cylinder to the knock sensor increases.

Referring now to FIG. 1C, a front view of engine 10 is shown. Engine block 9 includes a valley 10*b* where engine knock sensors 90*a* and 90*c* are mounted to block 9. By mounting knock sensors 90*a* and 90*c* in the valley 10*b*, a good signal to noise ratio may be available so that knock may be more reliably detected. However, the mounting locations of knock sensors 90*a*-90*d* may also allow some fuel injector control actions to be observed by some sensors and not by others. Thus, background noise levels of some cylinders may be higher or lower than other cylinders. Additionally, the distance of a fuel injector that opens or closes near a knock window of another engine cylinder may affect an amount of time that it takes for a vibration to travel from the operating fuel injector to the knock sensor. And, a longer time for the vibration to travel from the fuel injector to the knock sensor may allow the vibration to enter a knock window for a cylinder. As such, knock sensor location, firing order, and engine configuration may also affect engine knock background noise levels for some engine cylinders.

Thus, the system of FIGS. 1A-1C provides for a system for operating an engine, comprising: a variable displacement engine including at least one vibration sensing engine knock sensor; and a controller including executable instructions stored in non-transitory memory to adjust a crankshaft angle where a knock window of a first cylinder begins to detect piston slap of a second cylinder, where the first cylinder is deactivated, and adjust operation of the engine via the controller in response to detecting piston slap in the knock window of the first cylinder. The system further comprises additional instructions to retard spark timing of the second cylinder in response to a request to detect piston slap of the second cylinder. The system further comprises additional instructions to detect knock in a knock window of the second cylinder. The system further comprises additional instructions to adjust a crankshaft angle where the knock window of the first cylinder ends in response to a request to detect piston slap of the second cylinder. The system includes where the variable displacement engine is included in a hybrid vehicle.

Figure 2:
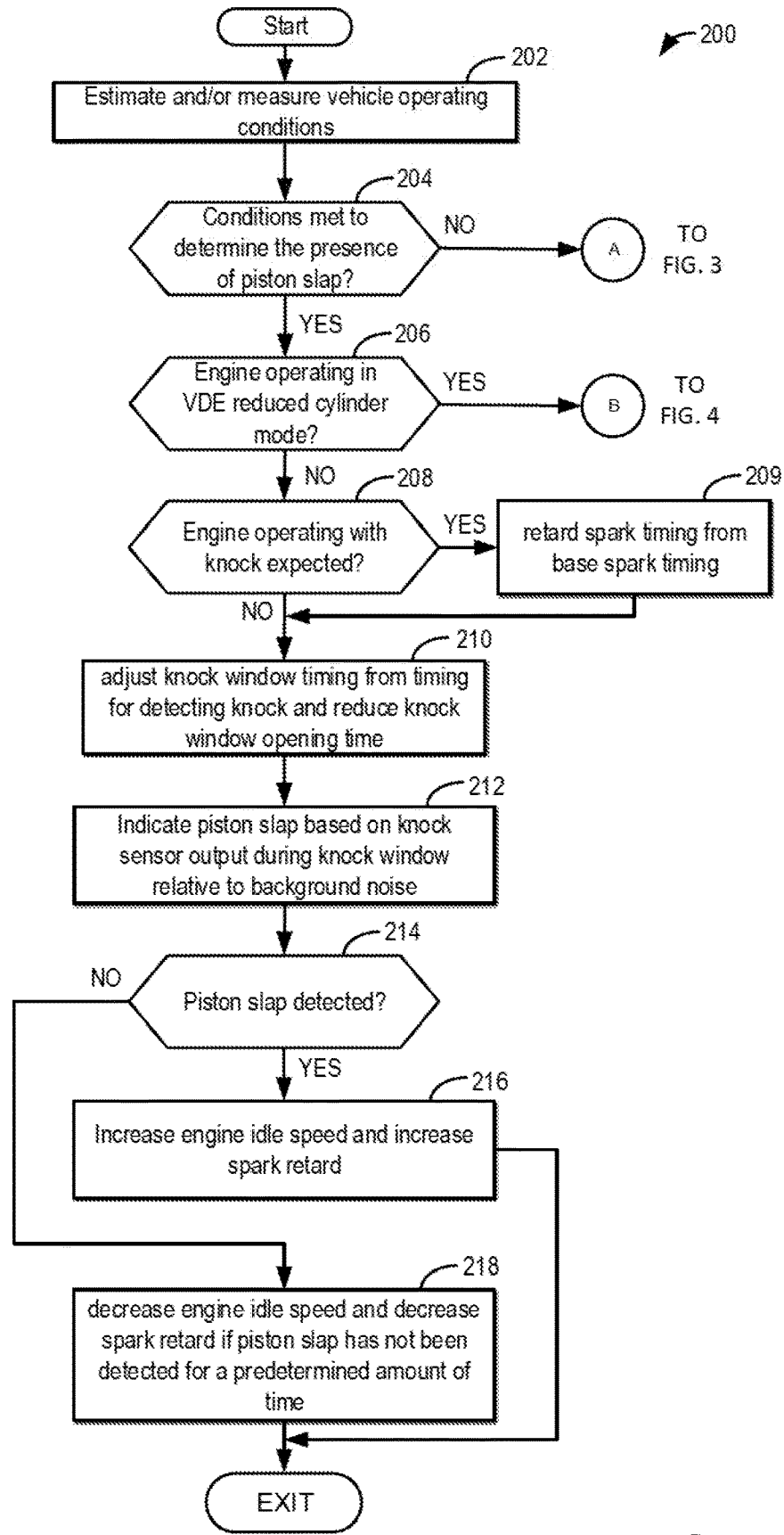
FIGS. 2-4 shows a high level flow chart of a way to operate an engine and detect piston slap.
Figure 3:
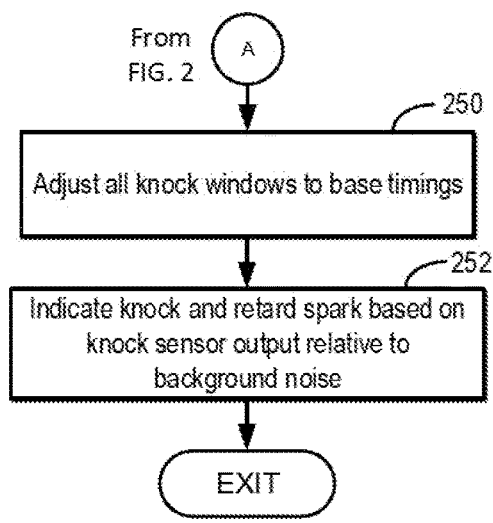
Figure 4:
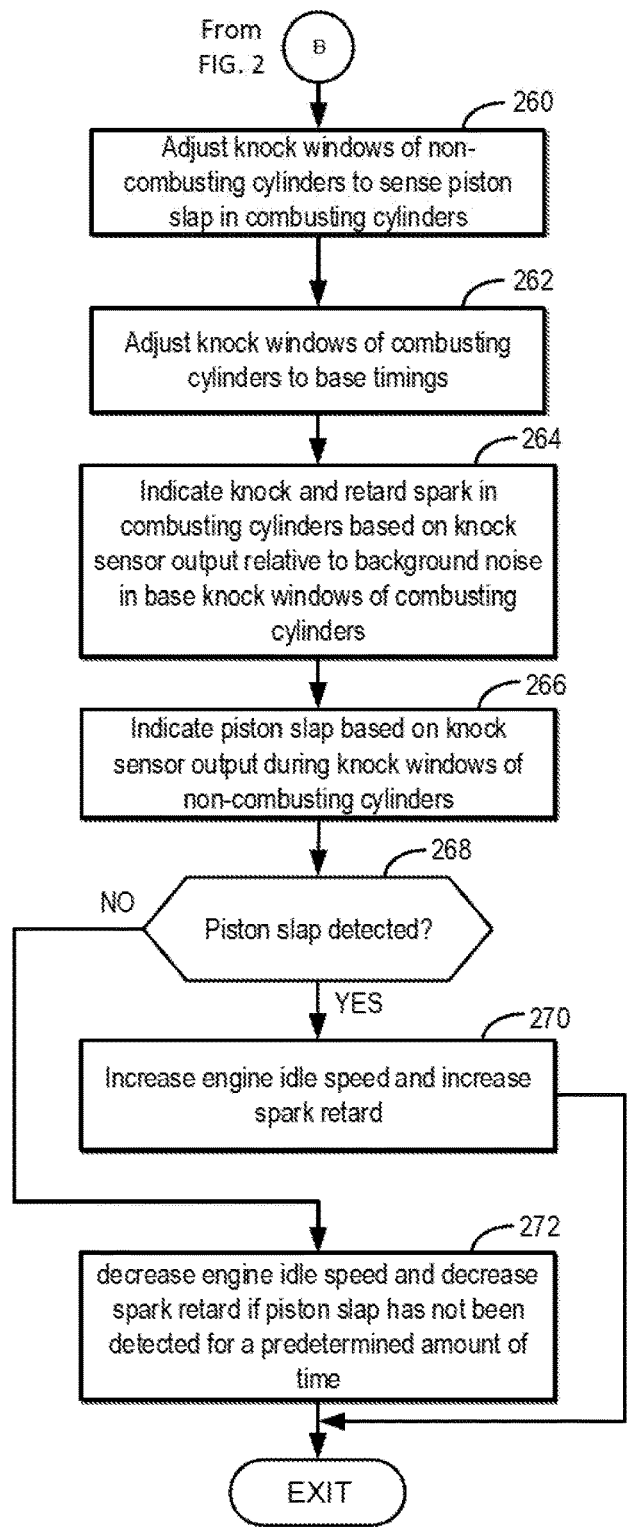

Referring now to FIGS. 2-4, a method for operating an engine is shown. The method of FIGS. 2-4 may be included in and may cooperate with the system of FIGS. 1A-1C. At least portions of method 200 may be incorporated in the system of FIGS. 1A-1C as executable instructions stored in non-transitory memory. In addition, other portions of method 200 may be performed via a controller transforming operating states of devices and actuators in the physical world. The controller may employ engine actuators of the engine system to adjust engine operation. Further, method 200 may determine selected control parameters from sensor inputs.

At 202, method 200 determines vehicle and engine operating conditions via the sensors described in FIGS. 1A-1C. Method 200 may determine operating conditions including but not limited to engine speed, engine load, engine temperature, ambient temperature, fuel injection timing, knock sensor output, fuel type, fuel octane, engine position, and engine air flow. Method 200 proceeds to 204.

At 204, method 200 judges if conditions are met for determining the presence of piston slap. In one example, method 200 may judge that conditions are present for determining the presence of piston slap when engine temperature is less than a threshold temperature and the engine has been operating (e.g., combusting fuel) for less than a threshold amount of time since a most recent engine start. If method 200 judges that conditions are met for determining the presence of piston slap, the answer is yes and method 200 proceeds to 206. Otherwise, the answer is no and method 200 proceeds to 250.

At 250, method 200 adjusts knock windows associated with each cylinder to base timings. In one example, base timings of a knock window associated with a cylinder may begin or open at five crankshaft degrees after top-dead-center compression stroke of the cylinder and end or close at forty crankshaft degrees after top-dead-center compression stroke of the cylinder so that the knock window for the cylinder is open for thirty five crankshaft degrees. The output of a knock sensor may be sampled and processed (e.g., filtered and integrated) while the knock window is open. Output of the knock sensor is not sampled when knock windows are closed. Each knock window of each cylinder may be set to base timings in this way. Method 200 proceeds to 252.

At 252, method 200 evaluates a present cylinder (i) (e.g., a cylinder having an open knock window or a knock window that has just closed) for the presence or absence of engine knock, where i is the cylinder number. The controller may evaluate one cylinder (i) at a time for the presence of knock. The value of i may be changed (e.g., from 1-8) so that all engine cylinders may be assessed for the presence of engine knock each engine cycle (e.g., two revolutions for a four stroke engine). Method 200 assesses whether or not engine knock should be indicated for a particular cylinder based on the engine knock background noise levels determined while the cylinder's knock window is open (e.g., the knock window associated with the cylinder). In one example, method 200 computes a knock intensity value for a particular cylinder by determining a value from integrating output of the knock sensor during the knock window of the particular cylinder (e.g., a particular engine crankshaft angular interval) and dividing the value of the integrated knock sensor output by the value of a value of an integrated engine knock background noise level for the particular cylinder. If the engine knock intensity value exceeds a threshold value (e.g., 2), then engine knock is indicated for the particular cylinder and spark timing for the particular cylinder is retarded by a predetermined amount. The spark is retarded for the particular cylinder and then the spark timing is advanced back toward the MBT (minimum spark advance for best engine torque) spark timing. For example, if the engine knock intensity value for cylinder number one exceeds a threshold level, then knock is indicated for cylinder number one and spark timing of cylinder number one is retarded by five crankshaft degrees. The spark timing for cylinder number one may be advanced by five crankshaft degrees within ten seconds of when the spark timing of cylinder number one was retarded based on the determination of knock in cylinder number one. If knock is not indicated, spark timing for the cylinder remains at its requested or base timing (e.g., MBT timing or knock limited spark timing). Knock for each engine cylinder may be determined in this way. Method 200 proceeds to exit after evaluating engine cylinders for knock.

At 206, method 200 judges if the engine is operating in a variable displacement engine (VDE) reduced cylinder mode. The engine may be operating in a VDE reduced cylinder mode if less than the total number of cylinders is combusting fuel. For example, if four cylinders of an eight cylinder engine are combusting fuel during a cycle of the engine and four cylinders are not combusting fuel during the cycle of the engine, it may be determined that the engine is operating in a VDE reduced cylinder mode. In one example, one or more cylinders may be deactivated while the engine operates in the VDE reduced cylinder mode by ceasing to flow fuel to deactivated cylinders. Further, intake and exhaust valves of the deactivated cylinders may be held closed over an entire engine cycle. If method 200 judges that the engine is operating in a VDE reduced cylinder mode, the answer is yes and method 200 proceeds to 260. Otherwise, the answer is no and method 200 proceeds to 208.

At 260, method 200 adjusts knock windows associated with engine cylinders that are not combusting fuel (e.g., deactivated cylinders) to detect piston slap in cylinders that are combusting fuel. Further, a band pass filter pass band may be lowered to improve detection of piston slap. Alternatively, a second pass band filter may process output of the knock sensor at a second pass-band frequency range to improve detection of piston slap. For example, as shown in FIG. 6, a knock window of a cylinder that is not combusting fuel may be advanced into a power or expansion stroke of a cylinder that is combusting fuel so that a knock sensor may be sampled and its output integrated or otherwise processed to determine if the cylinder in which fuel is combusting is experiencing piston slap. In other examples, a knock window of a cylinder that is not combusting fuel may be retarded into a power or expansion stroke of a cylinder that is combusting fuel so that a knock sensor may be sampled and its output integrated or otherwise processed to determine if the cylinder in which fuel is combusting is experiencing piston slap. In one example, the knock window associated with a cylinder that is not combusting fuel is adjusted so that it opens at fifty-five degrees after top-dead-center compression stroke of a cylinder that is combusting fuel and so that it closes at seventy degrees after top-dead-center compression stroke of the cylinder that is combusting fuel, for a total opening timing interval of fifteen crankshaft degrees. Thus, the knock window associated with a non-combusting cylinder may be advanced or retarded and its duration may be shortened so as to time the knock window of the non-combusting cylinder to be open when energy from piston slap in the combusting cylinder may have a greatest amount of vibrational energy that may be detected by the knock sensor. An example of such knock window timing adjustments is shown in FIG. 6.

In addition, in some examples, two or more knock windows may be opened during a power stroke or expansion stroke of each cylinder. The two or more knock windows may include filtering data from the knock sensor at one frequency for one knock window and filtering data from the knock sensor at a different frequency for the other knock window. For example, a second knock window which is opened to evaluate piston slap may be opened at 10 degrees after top-dead-center compression stroke of a cylinder and output of the knock sensor may be filtered via a filter with a lower pass band frequency for a total of 50 crankshaft degrees. This knock window may be open at a same time as another knock window of the cylinder is open, such that the two knock windows overlap. Output of the knock sensor during the first knock window may be may be processed via a filter with a 5-10 KHz pass band to detect engine knock and output of the knock sensor may be processed via a second filter with a pass band of 0.5-1 KHz pass band to detect piston slap. Method 200 proceeds to 262.

At 262, method 200 adjusts knock windows associated with each cylinder that is combusting to base timing. The base timings of a knock window associated with a cylinder that is combusting fuel may begin or open at five crankshaft degrees after top-dead-center compression stroke of the cylinder and end or close at forty crankshaft degrees after top-dead-center compression stroke of the cylinder so that the knock window for the cylinder is open for thirty five crankshaft degrees. The output of a knock sensor may be processed (e.g., filtered and integrated) while the knock window is open. Each knock window of each cylinder that is combusting fuel during a cycle of the engine may be set to its base timings in this way. Method 200 proceeds to 264.

At 264, method 200 evaluates a present cylinder (i) (e.g., a cylinder having an open knock window or a knock window that has just closed) in which fuel is being combusted during a present cycle of the engine for the presence or absence of engine knock. The engine may evaluate one cylinder (i) at a time for the presence of knock. The value of i may be changed (e.g., from 1-8) as the engine rotates during an engine cycle so that only engine cylinders in which fuel is being combusting during the present engine cycle may be assessed for the presence of engine knock during the engine cycle (e.g., two revolutions for a four stroke engine). Method 200 assesses whether or not engine knock should be indicated for a particular cylinder based on the engine knock background noise levels determined while the cylinder's knock window was open (e.g., the knock window associated with the cylinder).

In one example, method 200 computes a knock intensity value for a particular cylinder by integrating output of the knock sensor during the knock window of the particular cylinder (e.g., a particular engine crankshaft angular interval) to determine a value and dividing the value of the integrated knock sensor output by the value of an integrated engine knock background noise level for the particular cylinder. If the engine knock intensity value exceeds a threshold value (e.g., 2), then engine knock is indicated for the particular cylinder and spark timing for the particular cylinder is retarded by a predetermined amount. The spark is retarded for the particular cylinder and then the spark timing is advanced back toward the MBT (minimum spark advance for best engine torque) spark timing. For example, if the engine knock intensity value for cylinder number one exceeds a threshold level, then knock is indicated for cylinder number one and spark timing of cylinder number one is retarded by five crankshaft degrees. The spark timing for cylinder number one may be advanced by five crankshaft degrees within ten seconds of when the spark timing of cylinder number one was retarded based on the determination of knock in cylinder number one. If knock is not indicated, spark timing for the cylinder remains at its requested or base timing (e.g., MBT timing or knock limited spark timing). Knock for each engine cylinder may be determined in this way. Method 200 proceeds to 266 after evaluating engine cylinder (i) for knock.

At 266, method 200 evaluates a present cylinder (i) (e.g., a cylinder having a knock window that has just closed) for the presence or absence of piston slap. The engine may evaluate one cylinder (i) at a time for the presence of piston slap. As previously mentioned, the value of i may be changed (e.g., from 1-8) as the engine rotates during an engine cycle so that only engine cylinders in which fuel is being combusting during the present engine cycle may be assessed for the presence of piston slap during the engine cycle (e.g., two revolutions for a four stroke engine). Method 200 assesses whether or not piston slap should be indicated for a particular cylinder based on the value of piston slap background noise level and a value of integrated piston slap determined while a different cylinder's knock window is open. For example, as shown in FIG. 6, cylinder number one may be assessed for piston slap when the knock window of deactivated cylinder number three is open during the power or expansion stroke of cylinder number one.

In one example, method 200 computes a piston slap intensity value for a particular cylinder by integrating output of the knock sensor during the knock window of the different cylinder (e.g., a particular engine crankshaft angular interval) to determine an integrated piston slap value and dividing the integrated piston slap value by an integrated engine piston slap background noise value that was determined while the same knock window of the different cylinder is open. For example, during an open knock window of a different cylinder, output of a knock sensor may be integrated during a first five degrees that the knock window of the different cylinder is open to determine an integrated engine piston slap background noise level. Then, output of the same knock sensor may be integrated during the remaining time that the knock window of the different cylinder is open to determine an integrated piston slap value. In addition, adjustments to compensate for different lengths of the $1^{st}$ and $2^{nd}$ portions of the knock window may be required. Alternatively, the integrated engine piston slap background noise value may be previously determined by integrating the knock sensor output under (non-knocking) conditions where piston slap is known to be absent, or obtained from offline calibrations. The integrated piston slap value may be divided by the integrated engine piston slap background noise level to determine a piston slap intensity level. If the piston slap intensity value exceeds a threshold value (e.g., 2), then piston slap for the cylinder is indicated. Each cylinder in which fuel is combusted during the present engine cycle may be evaluated for piston slap in this way. Method 200 proceeds to 268 after evaluating engine cylinder (i) for piston slap.

At 268, method 200 judges if piston slap is present in the present cylinder that is being evaluated for piston slap. In one example, a data word or byte is updated at 266 when piston slap is detected in the cylinder being evaluated. If method 200 judges that piston slap has occurred during the present engine cycle for the present cylinder being evaluated for piston slap, the answer is yes and method 200 proceeds to 270. Otherwise, the answer is no and method 200 proceeds to 272.

At 270, method 200 increases the engine idle speed via increasing a throttle opening amount. In addition, the amount of fuel injected to the engine may be increased to increase the engine idle speed. Further, method 200 may increase spark retard of cylinders that are combusting fuel. By increasing the engine idle speed and retarding spark timing, it may be possible to control cylinder pressures and mask or reduce piston slap noise. Method 200 proceeds to exit.

At 272, method 200 decreases or maintains the engine idle speed via decreasing a throttle opening amount. In addition, the amount of fuel injected to the engine may be decreased to decrease the engine idle speed. Further, method 200 may decrease spark retard of cylinders that are combusting fuel. By decreasing the engine idle speed and advancing spark timing after piston slap has not been detected after a threshold amount of time has passed since a most recent engine start or after a threshold amount of time has passed since a most recent indication of piston slap occurred in the cylinder being evaluated, it may be possible to reduce engine fuel consumption when piston slap is not detected. Method 200 proceeds to exit.

At 208, method 200 judges if the engine is operating at conditions where engine knock may be present. In one example, method 200 may judge that engine knock may be present when engine load is greater than a threshold load. If method 200 judges that engine knock may be occur at the present engine operating conditions, the answer is yes and method 200 proceeds to 209. Otherwise, the answer is no and method 200 proceeds to 210.

At 209, retards spark timing for all or a fraction of engine cylinders from base spark timing. By retarding spark timing the possibility of engine knock may be decreased so that piston slap may be detected without being influenced by engine vibration that may be caused by engine knock. Method 200 proceeds to 210.

At 210, method 200 adjusts knock windows of all or a fraction of engine cylinders to detect piston slap in cylinders that are combusting fuel. Additionally, the cylinders spark timing has been retarded to reduce the possibility of knock. In one example as shown in FIG. 7, timing of a knock window associated with a cylinder is retarded from a base timing and the opening during of the knock window is decreased. The knock window opening timing is retarded so that the knock window may be open when impact between a piston and cylinder may be expected (e.g., during a crankshaft angle where crankshaft acceleration related to a cylinder is greatest during an engine cycle). Further, the amount of time or crankshaft angular interval that the knock window is open is shortened so that the signal to noise ratio for detecting piston slap may be increased. It should be noted that knock windows applied to detect piston slap may be advanced as compared to their base timings during some examples. Also, the knock window of a first cylinder whose spark has been retarded to ensure no knocking conditions, may be advanced or retarded to detect piston slap in a second cylinder (similar to the VDE case). The filtering (e.g., the pass band frequency range) of the knock sensor output (used for piston slap detection) may be adjusted to better suit piston slap detection as well.

In one example, the knock windows of all cylinders may be adjusted so that the knock window associated with a cylinder opens at fifty-five degrees after top-dead-center compression stroke of the cylinder and so that it closes at seventy degrees after top-dead-center compression stroke of the cylinder. An example of such knock window timing adjustments is shown in FIG. 7. Method 200 proceeds to 212.

At 212, method 200 evaluates a present cylinder (i) (e.g., a cylinder having a knock window that has just closed) for the presence or absence of piston slap. The engine may evaluate one cylinder (i) at a time for the presence of piston slap. As previously mentioned, the value of i may be changed (e.g., from 1-8) as the engine rotates during an engine cycle so that only engine cylinders in which fuel is being combusting during the present engine cycle may be assessed for the presence of piston slap during the engine cycle (e.g., two revolutions for a four stroke engine). Method 200 assesses whether or not piston slap should be indicated for a particular cylinder based on the piston background noise value determined while a knock window of the cylinder is open. For example, as shown in FIG. 7, cylinder number one may be assessed for piston slap when the knock window of cylinder one is open during the power or expansion stroke of cylinder number one.

In one example, method 200 computes a piston slap intensity value for a particular cylinder by integrating output of the knock sensor during the knock window of the cylinder (e.g., a particular engine crankshaft angular interval) to determine a piston slap value and dividing the piston slap value by an integrated engine piston slap background noise value that was determined while the knock window of the cylinder is open. For example, during an open knock window of cylinder number one, output of a knock sensor may be integrated during a first five degrees that the knock window of cylinder number one to determine an integrated engine piston slap background noise value. Then, output of the same knock sensor may be integrated during the remaining time that the knock window of cylinder number one is open to determine an integrated piston slap value. Adjustments to account for different lengths of the $1^{st}$ and $2^{nd}$ portions of the knock window may be provided. Alternatively, the integrated engine piston slap background noise value may be previously determined by integrating the knock sensor output under (non-knocking) conditions where piston slap is known to be absent, or obtained from offline calibrations. The integrated piston slap value may be divided by the integrated engine piston slap background noise value to determine a piston slap intensity level for cylinder number one. If the piston slap intensity value exceeds a threshold value (e.g., 2), then piston slap for cylinder number one is indicated. Piston slap may be evaluated for each cylinder in this way. Method 200 proceeds to 214 after evaluating engine cylinder (i) for piston slap.

At 214, method 200 judges if piston slap is present in the present cylinder that is being evaluated for piston slap. In one example, a data word or byte is updated at 212 when piston slap is detected in the cylinder being evaluated. If method 200 judges that piston slap has occurred during the present engine cycle for the present cylinder being evaluated for piston slap, the answer is yes and method 200 proceeds to 216. Otherwise, the answer is no and method 200 proceeds to 218.

At 216, method 200 increases the engine idle speed via increasing a throttle opening amount. In addition, the amount of fuel injected to the engine may be increased to increase the engine idle speed. Further, method 200 may increase spark retard of cylinders that are combusting fuel. By increasing the engine idle speed and retarding spark timing, it may be possible to control cylinder pressures and mask or reduce piston slap noise. Method 200 proceeds to exit.

At 218, method 200 decreases or maintains the engine idle speed via decreasing a throttle opening amount. In addition, the amount of fuel injected to the engine may be decreased to decrease the engine idle speed. Further, method 200 may decrease spark retard of cylinders that are combusting fuel. By decreasing the engine idle speed and advancing spark timing after piston slap has not been detected after a threshold amount of time has passed since a most recent engine start or after a threshold amount of time has passed since a most recent indication of piston slap occurred in the cylinder being evaluated, it may be possible to reduce engine fuel consumption when piston slap is not detected. Method 200 proceeds to exit.

In this way, timing of engine knock windows may be adjusted to improve detection of piston slap. Further, a knock window of a deactivated cylinder may be repurposed to detect piston slap in a cylinder that is combusting fuel so that knock and piston slap may be detected in an activated cylinder.

Thus, the method of FIGS. 2-4 provides for an engine operating method, comprising: adjusting a crankshaft angle where a knock window of a cylinder opens and adjusting a crankshaft angle where the knock window of the cylinder closes via a controller in response to a request to detect piston slap in the cylinder; and adjusting one or more actuators via the controller according to piston slap detected in the knock window. The method includes where the crankshaft angle where the knock window of the cylinder opens is retarded. The method further comprises reducing an actual total number of crankshaft degrees between the crankshaft angle where the knock window of the cylinder opens and the crankshaft angle where the knock window of the cylinder closes in response to the request to detect piston slap in the cylinder. The method further comprises retarding spark timing of the cylinder in response to the request to detect piston slap in the cylinder. The method includes where adjusting one or more actuators includes adjusting an engine throttle position and increasing an engine idle speed.

The method includes where adjusting one or more actuators includes further retarding spark timing. The method further comprises decreasing engine idle speed when piston slap is not detected for a threshold amount of time after the request to detect piston slap in the cylinder or after detection of piston slap.

The method of FIGS. 2-4 also provides for an engine operating method, comprising: operating an engine while a cylinder of the engine is deactivated for longer than a cycle of the engine via a controller; adjusting a crankshaft angle where a knock window of the cylinder opens and adjusting a crankshaft angle where the knock window of the cylinder closes via the controller in response to a request to detect piston slap in the cylinder; and adjusting one or more actuators via the controller according to piston slap detected in the knock window. The method includes where the crankshaft angle where the knock window of the cylinder opens is adjusted to a crankshaft angle within an expansion stroke of a different cylinder. The method includes where the crankshaft angle where the knock window of the cylinder closes is adjusted to a crankshaft angle within an expansion stroke of the different cylinder. The method further comprises opening and closing a knock window of the different cylinder during the expansion stroke of the different cylinder. The method includes where the knock window of the different cylinder is advanced of the knock window of the cylinder. The method includes where the engine is operating in a variable displacement mode when the cylinder is deactivated. The method includes where the cylinder is deactivated via ceasing to flow fuel to the cylinder. The method includes where adjusting one or more actuators includes opening an engine throttle and increasing an engine idle speed.

Referring now to FIG. 5, a timing sequence 500 illustrating example base engine knock window timing and base direct injector timing for an operating engine is shown. The illustrated timings are for an eight cylinder engine that has a firing order of 1-3-7-2-6-5-4-8. The engine is a four stroke engine that has a cycle of 720 crankshaft degrees. The engine crankshaft degrees are located along the horizontal axis and zero degrees represents top-dead-center compression stroke for cylinder number one. The eight cylinders are labeled along the vertical axis. The sequence moves from left to right.

The engine knock windows for each cylinder are positioned at a level of a tick mark along the vertical axis that is associated with the knock window. For example, the engine knock window for cylinder number one is indicated by slash bar 501. Knock windows for the remaining engine cylinders (2-8) are indicated by similar slash bars (502-508) that align with labeling along the vertical axis. The knock widows are open when the respective knock window bars are shown. The knock windows are closed when the respective knock window bars are not shown. For example, the knock window for cylinder number one (501) is open during the power or expansion stroke of cylinder number one and it is closed during the other strokes of cylinder number one. In this example, the knock windows open about five crankshaft degrees after top-dead-center compression stroke of the cylinder that the knock window is associated with (e.g., knock window 501 opens about five crankshaft degrees into the power stroke of cylinder number one). The knock windows close in the same cylinder cycle about 35 crankshaft degrees later.

The engine fuel injection timings for each cylinder are positioned at a level the tick mark along the vertical axis that is associated with the fuel injection. For example, solid bar 510 represents a DI fuel injector open interval for cylinder number two. The DI fuel injector for cylinder number two is closed when solid bar 510 is not visible. The DI fuel injector for cylinder number two opens at the left side of solid bar 510 and closes at the right side of solid bar 310. DI fuel injections for the remaining engine cylinders (2-8) are indicated by similar solid bars (511-517) and they follow the same convention as solid bar 310. The fuel injector bars 510-517 respectively align with cylinders listed along the vertical axis that the fuel injector bars correspond to.

The strokes of a cylinder are positioned just above a level the tick mark along the vertical axis that is associated with the stroke. For example, strokes for cylinder number one are indicated by horizontal lines 520-523. Letters p, e, i, and c identify the power (p), exhaust (e), intake (i), and compression (c) strokes associated with cylinder number one. Strokes for the other engine cylinders are identified in a similar way by lines 525-558.

The knock window timings shown in FIG. 5 allow the presence of engine knock to be detected for each cylinder of the engine. Further, background noise levels for the engine may be determined during the knock windows as previously mentioned. The timings of the knock windows may be provided in this way so that vibrations produced by engine knock occur within the knock windows with a high degree of reliability.

Referring now to FIG. 6, a timing sequence 600 illustrating example modified engine knock window timing for an operating engine is shown. The illustrated timings are for an eight cylinder engine that has a firing order of 1-3-7-2-6-5-4-8, but cylinders 3, 2, 5, and 8 are deactivated in this sequence such that the engine is operating in a VDE reduced cylinder mode. Bars are provided above the labels of the cylinders that are deactivated to indicate deactivated cylinders (e.g., cylinders that are not combusting). The engine is a four stroke engine that has a cycle of 720 crankshaft degrees. The engine crankshaft degrees are located along the horizontal axis and zero degrees represents top-dead-center compression stroke for cylinder number one. The eight cylinders are labeled along the vertical axis. The sequence moves from left to right.

The fuel injections, valve timings, cylinder strokes, and engine position for each of the cylinders shown in FIG. 6 are identical to those shown in FIG. 5, except as noted below. Therefore, for the sake of brevity, the description of these items will not be repeated. Nevertheless, the timings and sequence shown in FIG. 6 is identical to that shown in FIG. 5, except as noted.

In this example, knock windows associated with cylinders 3, 2, 5, and 8 have been advanced so that they may improve detection of piston slap in active cylinders 1, 7, 6, and 4. For example, knock window 502 has been removed and an advanced, shortened in duration knock window has been added in its place as indicated at 602a to improve detection of piston slap in cylinder number one. Likewise, knock window 504 has been removed and an advanced, shortened in duration knock window has been added in its place as indicated at 604a to improve detection of piston slap in cylinder number seven. Similarly, knock window 506 has been removed and an advanced, shortened in duration knock window has been added in its place as indicated at 606a to improve detection of piston slap in cylinder number six. Finally, knock window 508 has been removed and an advanced, shortened in duration knock window has been added in its place as indicated at 608a to improve detection of piston slap in cylinder number four.

Because cylinder number three is deactivated, it may experience lower cylinder pressures. Consequently, detecting piston slap in cylinder number three is not warranted. Instead, the knock window of cylinder number three is moved to a crankshaft angular interval where piston slap in cylinder number one may be expected so that unused knock window 502 may be adjusted as shown at 602a to improve piston slap detection for cylinder number one. Further, the presence of knock may still be detected in cylinder number one via knock window 501. Knock windows for cylinders 2, 5, and 8 are adjusted in a similar way. Accordingly, the possibility of detecting piston slap in active cylinders may be improved by adjusting knock windows that are associated with other cylinders (e.g., cylinders 3, 2, 5, and 8).

In this way, individual windows for detecting knock and piston slap in a cylinder may be provided via adjusting timing (e.g., crankshaft angles where the knock window opens and closes) of knock windows associated with deactivated cylinders. Output of knock sensors may be processed while the knock windows are open. For example, output of the knock sensor may be integrated to determine engine knock, background engine noise, and piston slap.

Referring now to FIG. 7, a timing sequence 700 that illustrates adjusting knock windows of all cylinders to improve detection of piston slap in all cylinders is shown. The illustrated timings are for an eight cylinder engine that has a firing order of 1-3-7-2-6-5-4-8. The engine is a four stroke engine that has a cycle of 720 crankshaft degrees. The engine crankshaft degrees are located along the horizontal axis and zero degrees represents top-dead-center compression stroke for cylinder number one. The eight cylinders are labeled along the vertical axis. The sequence moves from left to right.

The fuel injections, valve timings, cylinder strokes, and engine position for each of the cylinders shown in FIG. 7 are identical to those shown in FIG. 5, except as noted below. Therefore, for the sake of brevity, the description of these items will not be repeated. Nevertheless, the timings and sequence shown in FIG. 7 is identical to that shown in FIG. 5, except as noted.

In this example, the knock windows of each cylinder are retarded and shortened in duration to improve detection of piston slap in each cylinder. In this example, a knock window associated with each cylinder is retarded to an opening time of about 55 crankshaft degrees after top-dead-center compression stroke of the cylinder associated with the respective knock window. The knock windows are then closed at about sixty-five degrees after top-dead-center compression stroke of the cylinder associated with the respective knock window. For example, the knock window associated with cylinder number one (701b), is retarded with respect to timing of the base knock window associated with cylinder number one (501 of FIG. 5) to an opening time of about 55 crankshaft degrees after top-dead-center compression stroke of cylinder number one. The closing time of knock window 701b is closed at about sixty-five degrees after top-dead-center compression stroke of the cylinder number one. Likewise, the knock windows of cylinders 2-8 indicated at 702b-708b are likewise provided. These timings may provide improved detection of piston slap since knock windows are open when piston acceleration during a cycle of a cylinder may be highest.

In this way, individual windows for detecting piston slap in a cylinder may be provided via adjusting timing (e.g., crankshaft angles where the knock window opens and closes) of knock windows associated with activated cylinders. Output of knock sensors may be processed while the knock windows are open. For example, output of the knock sensor may be integrated to determine engine knock, background engine noise, and piston slap.

The timings referred to herein are exemplary in nature and are not intended to limit the scope of this disclosure. Rather, timings may be adjusted differently than shown herein to compensate for differences between engine designs.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine operating method, comprising:
operating an engine while a cylinder of the engine is deactivated for longer than a cycle of the engine via a controller;
operating the engine with a knock window of a knock sensor defined by at least a first and second angles;
adjusting the crankshaft angles to an adjusted crankshaft first angle where the knock window of the cylinder opens and an adjusted second crankshaft angle where the knock window of the cylinder closes via the controller in response to a request to detect piston slap in the cylinder, the piston slap detected from the knock sensor; and adjusting one or more actuators via the controller according to piston slap detected in the knock window.

2. The method of claim 1, where the crankshaft angle where the knock window of the cylinder opens is adjusted to a crankshaft angle within an expansion stroke of a different cylinder.

3. The method of claim 2, where the crankshaft angle where the knock window of the cylinder closes is adjusted to the crankshaft angle within the expansion stroke of the different cylinder.

4. The method of claim 3, further comprising opening and closing a knock window of the different cylinder during the expansion stroke of the different cylinder.

5. The method of claim 4, where the knock window of the different cylinder is advanced of the knock window of the cylinder.

6. The method of claim 1, where the engine is operating in a variable displacement mode when the cylinder is deactivated.

7. The method of claim 1, where the cylinder is deactivated via ceasing to flow fuel to the cylinder.

8. The method of claim 1, where adjusting one or more actuators includes opening an engine throttle and increasing an engine idle speed.

* * * * *